US009992450B1

(12) United States Patent
Yuan et al.

(10) Patent No.: US 9,992,450 B1
(45) Date of Patent: Jun. 5, 2018

(54) SYSTEMS AND METHODS FOR BACKGROUND CONCEALMENT IN VIDEO CONFERENCING SESSION

(71) Applicant: Apple Inc., Cupertino, CA (US)

(72) Inventors: Hang Yuan, San Jose, CA (US); Chris Y. Chung, Sunnyvale, CA (US); Dazhong Zhang, Milpitas, CA (US); Hsi-Jung Wu, San Jose, CA (US); Xiaosong Zhou, Campbell, CA (US); Jae Hoon Kim, San Jose, CA (US); Jiefu Zhai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/468,919

(22) Filed: Mar. 24, 2017

(51) Int. Cl.
| | |
|---|---|
| *H04N 7/14* | (2006.01) |
| *H04N 7/15* | (2006.01) |
| *H04N 5/262* | (2006.01) |
| *G06K 9/00* | (2006.01) |
| *G06K 9/46* | (2006.01) |

(52) U.S. Cl.
CPC ............ *H04N 7/15* (2013.01); *G06K 9/00711* (2013.01); *G06K 9/4604* (2013.01); *H04N 5/262* (2013.01); *G06K 2009/4666* (2013.01)

(58) Field of Classification Search
CPC ........ H04N 19/21; H04N 5/225; H04N 5/262; G06T 7/0081; G06T 7/0083; G06T 7/20; G06K 9/00771; G06K 9/36
USPC ......... 348/14.01, 14.02, 14.03, 14.07, 14.08, 348/14.1, 14.12, 14.14, 586, E07.078
See application file for complete search history.

(56) References Cited

U.S. PATENT DOCUMENTS

| | | | | |
|---|---|---|---|---|
| 6,751,347 | B2 * | 6/2004 | Pettigrew | G06T 11/001 348/E9.056 |
| 6,973,130 | B1 * | 12/2005 | Wee | G06T 9/20 375/240.08 |
| 7,433,535 | B2 * | 10/2008 | Mukherjee | G06T 5/004 358/3.26 |
| 9,013,536 | B2 * | 4/2015 | Zhu | H04N 19/21 348/14.02 |
| 2001/0028735 | A1 * | 10/2001 | Pettigrew | G06T 11/001 382/162 |
| 2002/0093670 | A1 * | 7/2002 | Luo | G06K 9/52 358/1.9 |
| 2004/0032906 | A1 * | 2/2004 | Lillig | G06T 7/12 375/240.08 |
| 2006/0126719 | A1 * | 6/2006 | Wilensky | G06T 7/194 375/240.01 |

(Continued)

*Primary Examiner* — Binh Kien Tieu
(74) *Attorney, Agent, or Firm* — Baker Hostetler LLP; Robert L. Hails

(57) ABSTRACT

Embodiments of the present disclosure provide systems and methods for background concealment in a video conferencing session. In one exemplary method, a video stream may be captured and provided to a first terminal participating in a video chat session. A background element and a foreground element may be determined in the video stream. A border region may additionally be determined in the video stream. The border region may define a boundary between the foreground element and the background element. The background region may be modified based, at least in part, on video content of the border region. The modified video stream may be transmitted to a second terminal participating in the video conferencing session.

34 Claims, 11 Drawing Sheets

(56) References Cited

U.S. PATENT DOCUMENTS

| | | | | |
|---|---|---|---|---|
| 2007/0097268 | A1* | 5/2007 | Relan | H04N 9/74 348/584 |
| 2008/0077953 | A1* | 3/2008 | Fernandez | H04N 7/15 725/32 |
| 2010/0110481 | A1* | 5/2010 | Do | H04N 1/00204 358/1.15 |
| 2012/0327172 | A1* | 12/2012 | El-Saban | G06T 7/194 348/14.02 |
| 2013/0127844 | A1* | 5/2013 | Koeppel | G06T 15/205 345/419 |
| 2014/0089326 | A1* | 3/2014 | Lin | G06F 17/30259 707/749 |
| 2014/0368669 | A1* | 12/2014 | Talvala | G06T 7/194 348/207.1 |
| 2015/0003725 | A1* | 1/2015 | Wan | G06T 7/0081 382/154 |
| 2015/0089348 | A1* | 3/2015 | Jose | G06F 17/30905 715/234 |
| 2016/0027187 | A1* | 1/2016 | Wang | G06T 7/73 382/164 |
| 2016/0350585 | A1* | 12/2016 | Lin | H04N 7/15 |
| 2016/0350592 | A1* | 12/2016 | Ma | G06K 9/4671 |
| 2017/0064199 | A1* | 3/2017 | Lee | H04N 5/23219 |
| 2017/0142371 | A1* | 5/2017 | Barzuza | H04N 7/152 |
| 2017/0200315 | A1* | 7/2017 | Lockhart | G06T 19/006 |
| 2017/0228867 | A1* | 8/2017 | Baruch | G06T 7/0089 |

\* cited by examiner

100

200

300

500

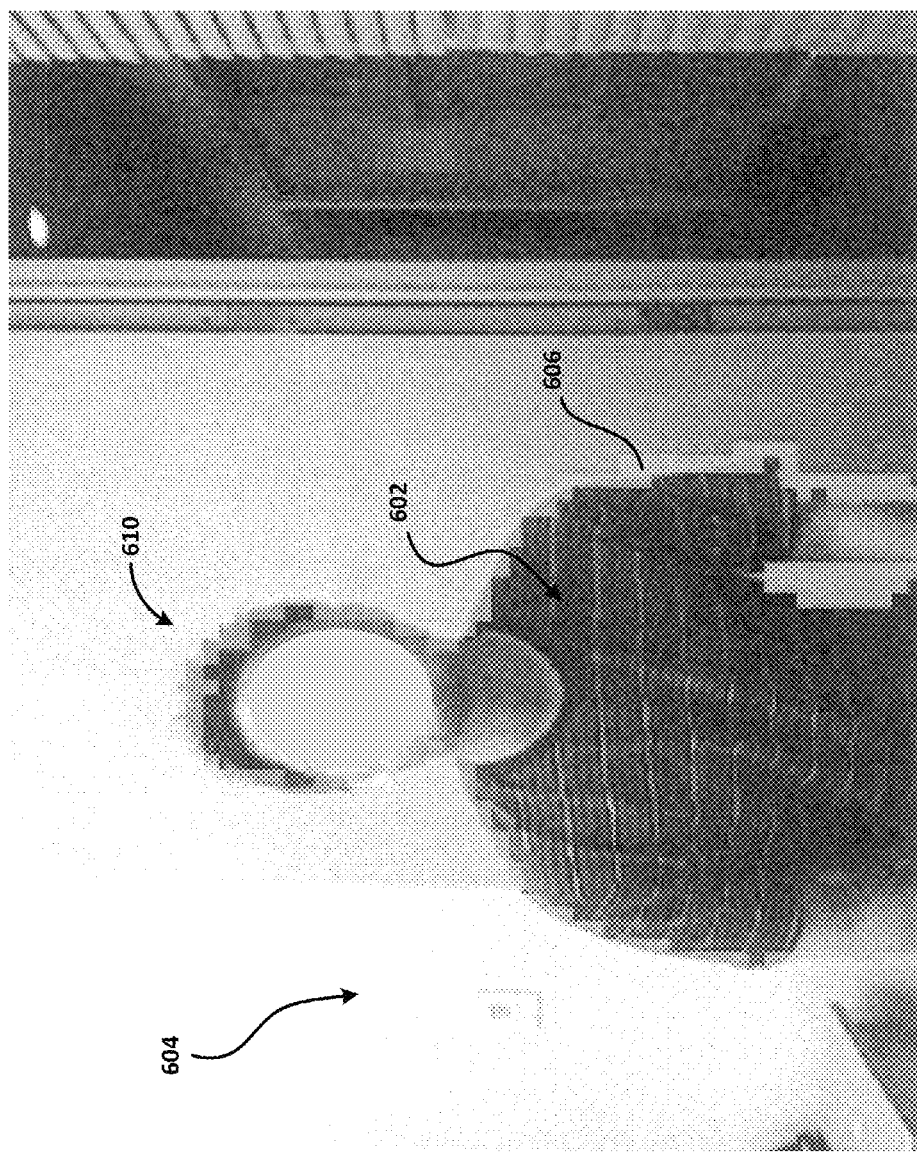

600B

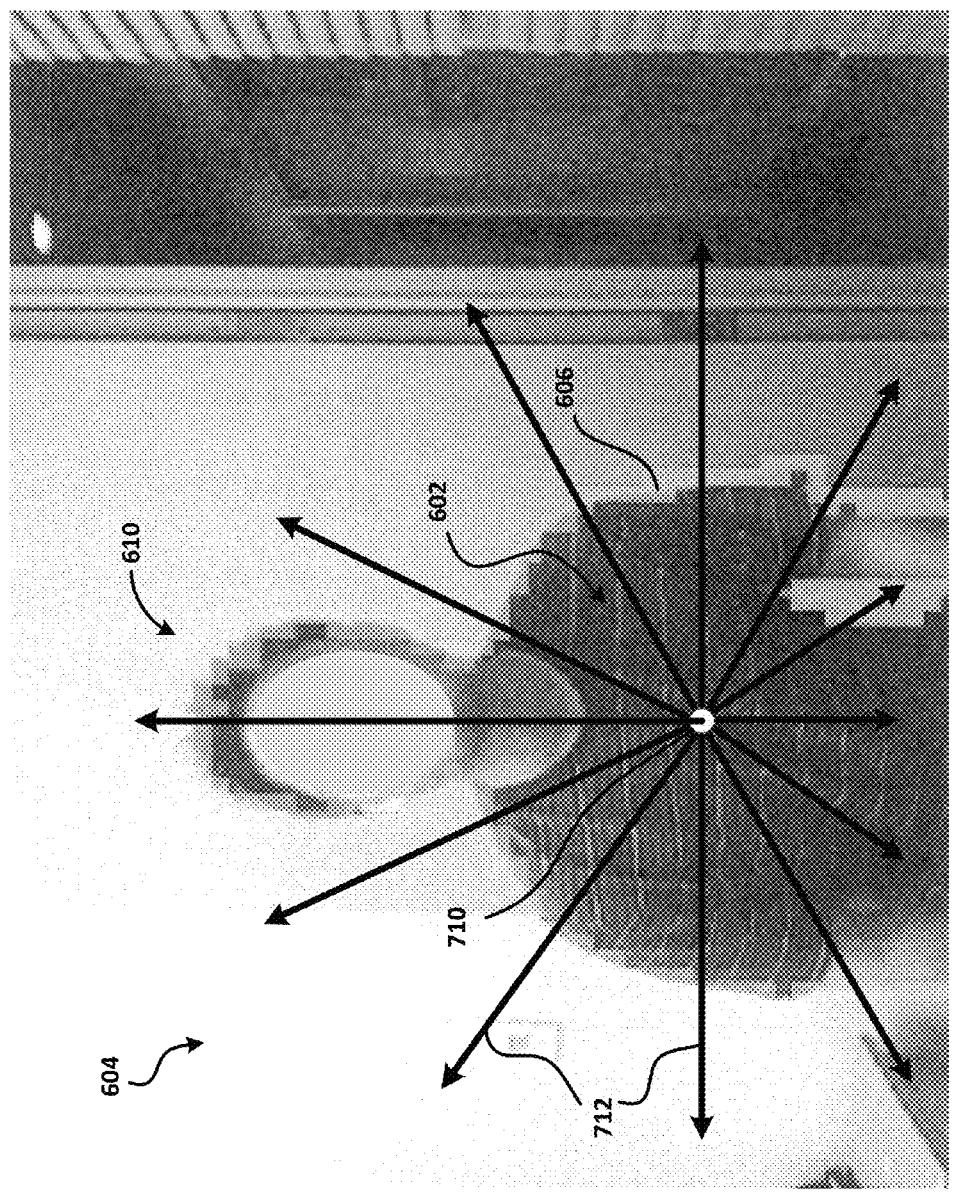

800

900

SYSTEMS AND METHODS FOR BACKGROUND CONCEALMENT IN VIDEO CONFERENCING SESSION

BACKGROUND

The present disclosure relates to video processing and, more particularly, background concealment in a video conferencing session.

Video conferencing systems provide services to transmit a video stream from a first device to one or more other devices that participate in a video conferencing session. In one use case, the content of the video stream depicts the user of the video conferencing system, as captured by a video capture device such as a camera. The video stream also may depict a background behind the user. It is sometimes desirable to hide or replace the background, such as for security or privacy purposes. Yet, distinguishing foreground elements in a video stream (e.g., the user) from other background elements often can be a computationally intense process, one that cannot be performed in real time by processing devices such as mobile phones that have limited processing resources.

Accordingly, there is a need for improved video chat processing to efficiently conceal a background in a video stream that conserves processing resources in a processing device.

BRIEF DESCRIPTION OF THE DRAWINGS

FIG. 6A illustrates a frame of a video conferencing video stream according to an embodiment of the present disclosure.

FIG. 7 illustrates a frame of a video conferencing video stream according to an embodiment of the present disclosure.

DETAILED DESCRIPTION

Embodiments of the present disclosure provide systems and methods for background concealment in a video conferencing session. In one example method, a first terminal may generate a video stream. A border region may be identified in the video stream. The border region may comprise a boundary between a foreground element of the video stream and a background element of the video stream. The background element may be modified, based at least in part, on video content from the border region. The modified video steam may thereafter be transmitted to a second terminal.

Figure 1:
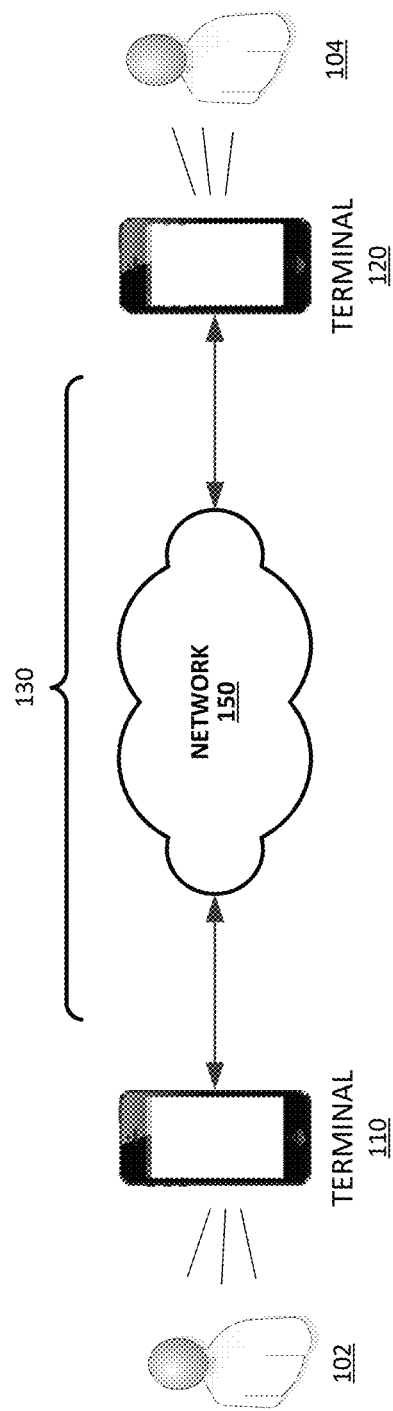
FIG. 1 illustrates a system according to an embodiment of the present disclosure.

FIG. 1 illustrates a system 100 according to an embodiment of the present disclosure. The system 100 may include a pair of terminals 110, 120 that communicate via a channel 130. A first terminal 110, for example, may capture video data of a local environment, which includes a representation of an operator 102 of the terminal 110. The first terminal 110 may code the captured video and transmit the coded video to the second terminal 120. The second terminal 120 may decode the coded video and render it locally on the device to an operator 104 of the second terminal. If bidirectional exchange of video is desired, the second terminal 120 may capture video data of its local environment, which includes a representation of the operator 104. The second terminal 120 may code the captured video and transmit the coded video to the first terminal 110. The first terminal 110 may decode the coded video that it receives and render it locally on the device to the operator 102.

In FIG. 1, the terminals 110, 120 are illustrated as smart phones but the principles of the present disclosure are not so limited. Embodiments of the present disclosure find application with laptop computers, tablet computers, media players and/or dedicated video conferencing equipment. Furthermore, while the present disclosure discusses application of the methods and techniques disclosed herein within the context of video conferencing, such methods and techniques are further applicable to other systems involving video coding. For example, the methods and techniques of the present disclosure may find application in a unidirectional video broadcast platform, such as a live video game streaming platform (e.g., Twitch) in which a live depiction of the player may be superimposed over the gameplay.

The channel 130 represents communication or storage media through which coded video streams are exchanged between the terminals 110, 120. To support real-time unidirectional or bidirectional exchange of video, the channel 130 may be provided by one or more of networks 150 that convey coded video data among the terminals 110, 120, including for example wireline and/or wireless communication networks. A communication network 150 may exchange data in circuit-switched and/or packet-switched channels. Representative networks include telecommunications networks, local area networks, wide area networks and/or the Internet. In another embodiment, the channel 130 may be provided as a storage device (not shown), for example, an electrical, optical or magnetic storage device. For the purposes of the present discussion, the architecture and topology of the channel 130 is immaterial to the operation of the present disclosure unless explained herein below.

Figure 2:
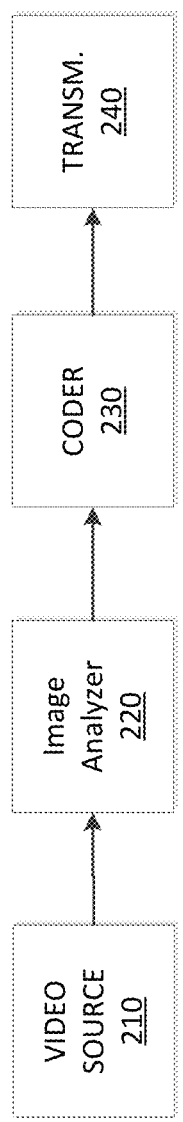
FIG. 2 illustrates system according to an embodiment of the present disclosure.

FIG. 2 illustrates a system 200 according to an embodiment of the present disclosure. In the system 200, a video source 210 may provide video data, which may include image content of a foreground element (e.g., an operator) and one or more background elements, to an image analyzer 220. The image analyzer 220 may process the video data by performing one or more background concealment methods and techniques disclosed herein. For example, the image analyzer 220 may identify a border region between the foreground element and the background element(s) in the video data and may modify the background element(s) based on video content from the border region. The modified video data may be provided to a coder 230. The coder 230 may encode the modified video data according to various video coding algorithms or standards, such as H.264. The coded video data may thereafter be provided as a transmission 240, which may be sent to a terminal for decoding and display.

The video source 210 may be embodied in various forms. For example, the video source 210 may comprise one or more cameras incorporated or otherwise connected with a terminal and which may capture the video data. As another example, the video source 210 may comprise an application, such as a video game, that may execute on a terminal. It will be understood that the video source 210 may comprise more than one type of video source. For example, the video source 210 may include both video data captured by a camera (e.g., video data depicting an operator) and video data generated by an application (e.g., gameplay video of a video game). As another example, the video source 210 may comprise a digital storage medium, such as an optical storage medium (e.g., a digital video disc (DVD)), a non-volatile storage medium (e.g., a hard disk drive, a solid-state drive, or flash memory), or a volatile storage medium (e.g., random-access memory (RAM)). As such, the video data provided by the video source 210 is not necessarily live or near live, but may include video data that was initially generated prior in time and stored for later processing and encoding according to the methods and techniques disclosed herein.

As indicated, the image analyzer 220 may receive the video data from the video source 210. The image analyzer 220 may process the received video data according to one or more methods and techniques described herein. For example, the image analyzer 220 may identify a foreground element and one or more background elements in the video data. The foreground element may include an operator, for example. The background element(s) may include the environment occupied by the operator or other foreground subject. For example, the background element(s) may include the background walls, desk, whiteboard, or other objects within an office occupied by the operator. The image analyzer 220 may further identify a border region that forms a boundary between the foreground element and the background element(s). The border region may represent a portion of video content at which it is relatively uncertain as to whether the portion should be included as part of the foreground element or as part of the background element(s).

Having identified the foreground element, the background element(s), and/or the border region, the image analyzer 220 may modify the background element(s) based on video content from the border region. For example, in one aspect, the image analyzer 220 may partition each of the background element(s) and the border region into pluralities of clusters. The image analyzer 220 may compare the video content (e.g. color) of each background cluster with the video content of one or more of the border clusters to determine a border cluster with video content that most closely matches that of the respective background cluster. The determined border cluster may thereby be used to replace the respective background cluster. As another example, the image analyzer 220 may again partition each of the background element(s) and the border region into pluralities of clusters. The image analyzer 220 may identify a center of the foreground element. The center may represent, as examples, the center of the operator's chest region or the center of the operator's face. Further, the image analyzer 220 may define a plurality of vectors extending from the center of the foreground element into at least a portion of the background element(s). Each vector may point to a particular background cluster and thereby may be associated with that background cluster. For each background cluster, the image analyzer 220 may replace the background cluster with a border cluster through which the associated vector passes.

Selection of the particular border cluster to use in the replacement may be performed, as examples, according to the nearest match in video content with that of the background cluster or according to the border cluster that is nearest the background cluster.

After the image analyzer 220 processes the video data, the coder 230 may encode the modified video data according to one or more known video coding algorithms or standards. For example, the modified video data may be encoded according to the H.264, H.320, or other encoding standard known in the art.

The encoded video data may thereafter be provided as the transmission 240. The transmission 240 may be sent to another terminal, at which the transmission 240 may be decoded and displayed to the operator of that terminal. The transmission 240 may be sent over the channel 130, including the network 150, described in relation to FIGS. 1 and 10.

One skilled in the art will appreciate that the system 200 may be implemented by software, hardware, or a combination of software and hardware. For example, the system 200 or portions thereof may be implemented with software executing on and/or hardware incorporated with one or more of the terminals 110, 120 described in relation to FIGS. 1 and 10. Furthermore, the system 200 or portions thereof may be implemented as a set of instructions that may be stored on a non-transitory computer-readable medium and executed by a processor.

Figure 3:
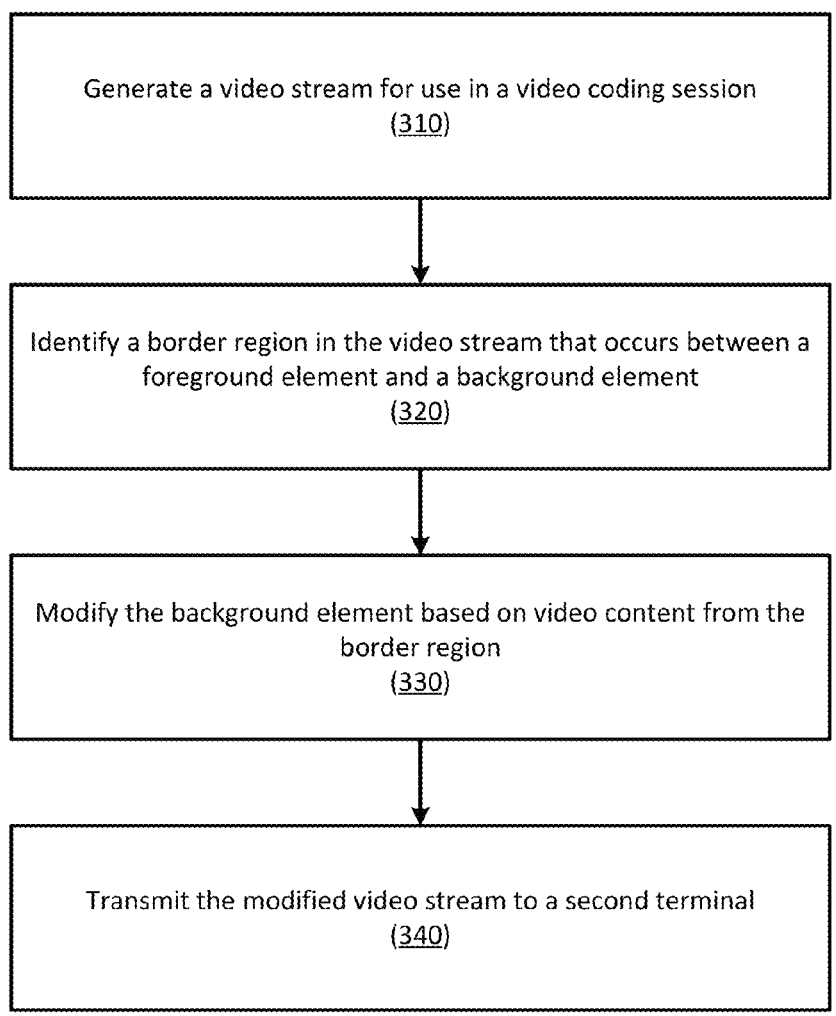
FIG. 3 illustrates a method according to an embodiment of the present disclosure.

FIG. 3 illustrates a method 300 according to an embodiment of the present disclosure. The method 300 may begin by generating a video stream for use in a video coding session (box 310). The method 300 may identify from the video stream a border region that occurs between a foreground element of the video stream and a background element of the video stream (box 320). The method 300 may modify the background element of the video stream based on video content from the border region (box 330). Thereafter, the method 300 may transmit the modified video stream to a second terminal (box 340).

Operation of the method 300 is expected to be computationally inexpensive as compared to other techniques that attempt to classify video data either as foreground or background elements on a pixel-by-pixel basis. Using the technique illustrated in FIG. 3, precise classifications can be avoided and, instead, a boundary region may be defined having a width sufficient to capture a transition between foreground content and background content. Thereafter, by using image content of the boundary region to mask background content, the method 300 may obscure image artifacts that otherwise might arise if background content were masked from a region outside the boundary region but background content persisted in the boundary region.

Generation of the video stream may occur in a variety of ways. It is expected that the method 300 typically will operate on video data captured by cameras, which includes image content of a foreground element and image content of one or more background elements. The method 300, however, also can be performed on computer-generated video data, such as video data output by an application executing on the device that performs the method 300 (for example, a video game). And, further, the method 300 may execute on video data that represents a composite of video data captured by a camera and computer-generated video elements, which might be generated by an application that augments camera video data with icons or other graphical elements.

Identification of the border region may comprise an identification of the foreground element and/or the background element. The foreground element may include, for example, an operator of the terminal and a participant in a video conferencing session. The foreground element may comprise a portion of (including the entirety of) a foreground region. Similarly, the background element may comprise a portion of (including the entirety of) a background region. For example the background region may comprise the operator's present environment and the background element may include one or more objects in that environment (e.g., a back wall, a desk, a doorway, a whiteboard, etc.).

Figure 6B:
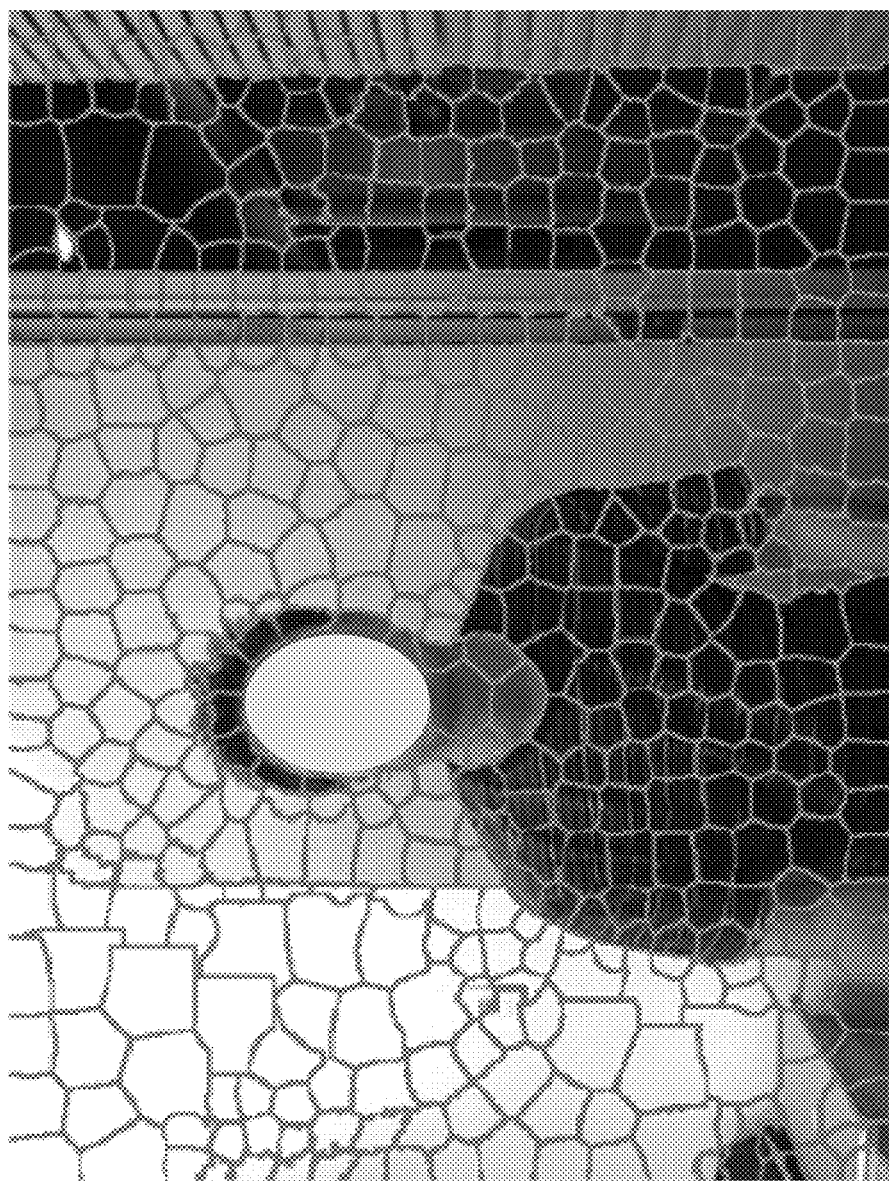
FIG. 6B illustrates a frame of a video conferencing video stream according to an embodiment of the present disclosure.

As an illustrative example, FIG. 6A shows a frame 600 of a video stream of a video coding session, such as a video stream captured by a camera associated with a first terminal. The frame 600 depicts an operator 610 of the first terminal within an office setting. A foreground element 602 is identified in a foreground region and generally includes most of the portions of the frame 600 that represent the operator 610. A background element 604 in a background region is also identified. The background region generally includes most of the portions of the frame 600 that do not represent the operator 610 and instead represent one or more objects in the office setting (e.g., a wall, a door, a hallway, etc.) in which the operator 610 is present. A border region 606 is further identified. The border region 606 generally comprises portions of the frame 600 that are between the background element 604 and the foreground element 602, thus forming a thin contour over the boundary therebetween.

With attention again to the method 300 of FIG. 3, the border region may represent a region in which it is relatively uncertain as to whether it comprises part of the foreground element or the background element. For example, the determination of the background element, the foreground element, and the border region may incorporate a probability or certainty aspect in which portions (e.g., a pixel or cluster of pixels) of the frame of the video stream is determined to belong to the background element or the foreground element to a calculated certainty. If the calculated certainty of a portion is above a pre-determined certainty threshold, then the portion may be deemed to comprise, at least in part, the background element or the foreground element, as the case may be. If the calculated certainty of the portion is below the pre-determined certainty threshold, then the portion may be deemed to comprise the border region.

To illustrate, an example certainty threshold may be 90% certainty. If a portion of the frame of the video stream is determined to be part of the background element with a 95% certainty, that portion may comprise, at least in part, the background element. Similarly, if another portion of the frame of the video stream is determined to be part of the foreground element with a 99% certainty, that portion may comprise, at least in part, the foreground element. However, if yet another portion of the frame of the video stream is determined to be part of the background element with a 60% certainty and determined to be part of the foreground element with a 40% certainty, that portion may comprise, at least in part, the border region because the certainty value for that portion does not meet or exceed the certainty threshold of 90%.

The background element, the foreground element, and the border region may be identified using one or more of a variety of techniques.

As one example, the background and foreground elements and/or the border region may be identified using a depth mapping technique. In such a technique, a depth for each pixel or other sub-region of a frame of the video stream may be determined. The depth may represent a position of the object in the pixel or other sub-region relative to the camera 206 of the first terminal 110. The depth for each pixel or sub-region may be determined, as one example, based on motion detected between frames of the video stream. A parallax effect may be recognized between objects in the video stream and may be used to determine depth. In embodiments in which the first terminal 110 includes a pair of similarly-faced cameras, the binocular disparity of objects in the resultant stereoscopic video stream may be analyzed and leveraged to determine a depth for each pixel or other sub-region of a frame of the video stream. Such methods of determining depth are merely illustrative and other techniques known in the art may be similarly employed. For example, the various depths of portions of the video stream may be determined based on the degree of focus or sharpness of the portion. With the depth of each pixel or other sub-region of the frame of the video stream determined, the background and foreground elements and/or the border region may be identified accordingly. For example, an edge-based range segmentation algorithm may be utilized to identify the background and foreground elements and/or the border region based on the determined depth map of the frame of the video stream.

As another example, the background and foreground elements and/or the border region in the video stream may be identified using an object recognition technique. Specifically, a facial and/or body recognition algorithm may be used to identify one or more operators in the video stream. Since the operator is the primary subject of the video chat, portions of the frame of the video stream that are identified, above a pre-determined threshold of certainty, as corresponding to the operator's head and/or body may comprise the foreground element. Likewise, areas of the frame of the video stream that are identified, above a pre-determined threshold of certainty, as not corresponding to the operator's head and/or body may comprise the background element. Areas of the frame of the video that were not determined to belong to either of the foreground or background elements above the pre-determined certainty thresholds may comprise the border region.

Other exemplary techniques by which the background and foreground elements and/or the border region may be determined may include edge detection, motion detection, or region-growing methods. The disclosure is not limited to the aforementioned techniques. It is contemplated that other image processing techniques known in the art may be employed to identify the background and foreground elements and/or the border region in the video stream.

As noted above, the background element may be modified based, at least in part, on video content from the border region. As one example, the background element may be modified based on one or more colors present in the border region. In one exemplary method of modifying the background element, discussed in detail below in relation to FIG. 4, the background element and the border region may each be partitioned into a plurality of clusters. For each cluster of the background element, the cluster may be replaced with a cluster of the border region that most closely matches the color of the cluster of the background element. In another exemplary method of modifying the background element, discussed in detail below in relation to FIG. 5, a center of the operator comprising the foreground element may be determined. With a series of vectors extending outward from the center of the operator, the background element may be modified according to a color of the border region through which the respective vector passes. Thus the color of the border region may be effectively extended outward into the background element.

The modification of the background element may have the effect of obscuring details in the background region, thus maintaining an element of privacy and informational security in the video conferencing session. For example, private writings or formulas on a whiteboard behind the operator may be obscured so that the writings or formulas are unintelligible in the modified background element.

Responsive to the background element being modified, a blur effect may optionally be applied to the background element. For example, a Gaussian blur effect may be applied to the background element. The blur effect may act to further obscure any remaining details in the background element as well as to remove visual artifacts from any clustering that may have been performed on the background element.

The video stream with the modified background element may be encoded prior to transmittal to the second terminal. For example, the encoding may include a compression process according to one of any known compression standards, such as H.264 or H.320. The encoded video stream may then be transmitted to the second terminal where the video stream may be decoded and viewed by a second operator.

It will be understood that the method 300, as well as other methods and techniques described herein, may be implemented as program instructions. To this end, program instructions implementing the method 300 and other methods and techniques disclosed herein may be stored on a non-transitory computer-readable medium.

Figure 4:
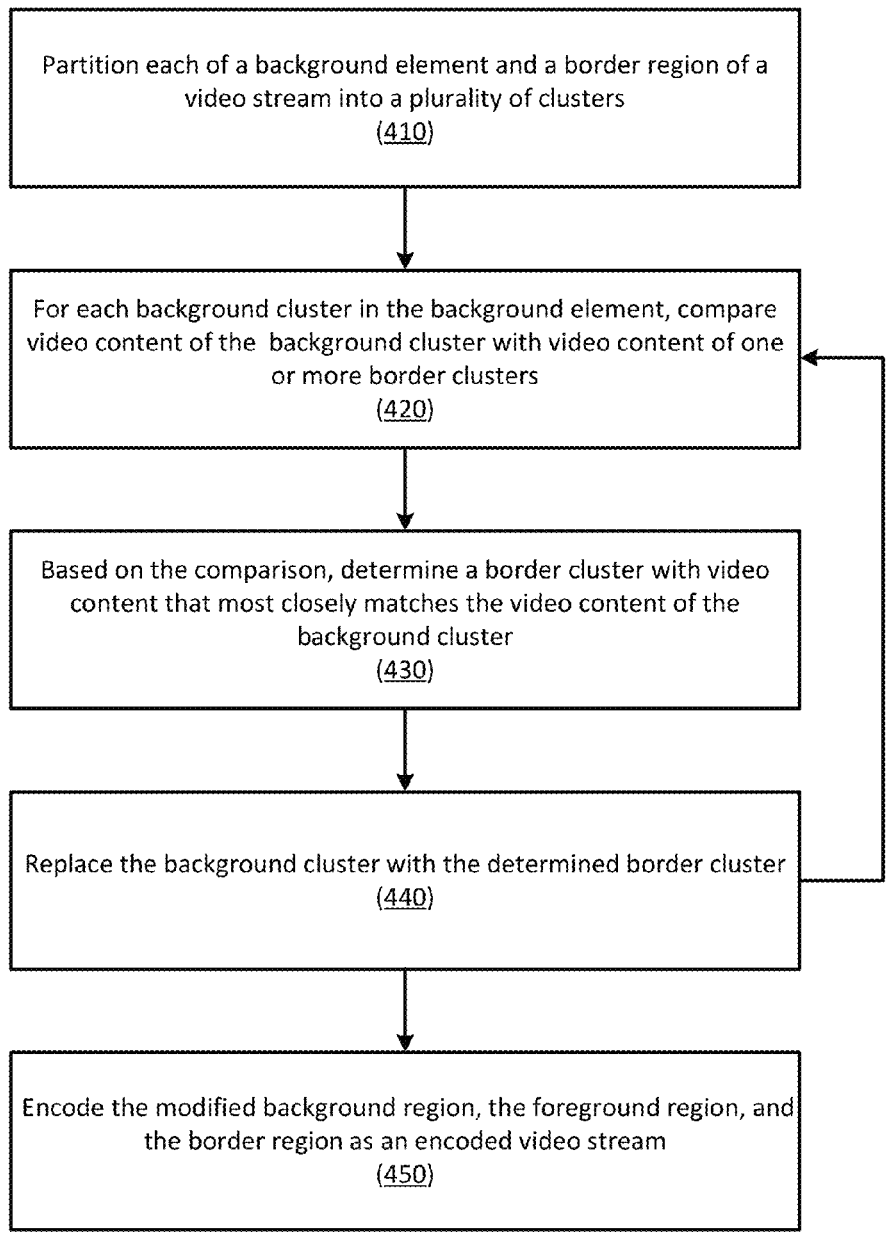
FIG. 4 illustrates a method according to an embodiment of the present disclosure.

FIG. 4 illustrates a method 400 of modifying one or more frames of a video stream according to an embodiment of the present disclosure. The method 400 may be utilized, for example, during such a modification performed in the method 300 discussed in relation to FIG. 3. It is assumed that the background element, the foreground element, and/or the border region have already been identified in one or more frames of the video stream.

The method 400 may initially partition the background element into a plurality of background clusters and the border region into a plurality of border clusters (box 410). For each of one or more background clusters, the method 400 may compare video content of the background cluster with video content of one or more border clusters (box 420). Based on this comparison, the method 400 may determine a border cluster with video content that most closely matches the video content of the background cluster (box 430). The method 400 may replace the background cluster with the determined border cluster (box 440). Thereafter, the method 400 may encode the modified background element in an encoded video stream, which may be transmitted to a second terminal (box 450).

As with the method 300, the method 400 may be less computationally demanding than other techniques that attempt to classify video data either as foreground or background elements on a pixel-by-pixel basis. The method 400 may serve to obscure private or security-sensitive information that may be present in any background elements of the video data. By replacing video content in the background element with most-closely matched video content from the boundary region, the visual delineation between the background element and the boundary region and/or foreground element may be minimized. For example, before applying one or more of the methods or techniques disclosed herein, a viewer may be able to perceive the delineation between the foreground element (e.g., the depicted operator) and background element(s).

As one example technique of partitioning the background element and the border region into respective pluralities of clusters, the entirety of the frame of the video stream may be partitioned into a plurality of clusters with some clusters being associated with the background element, some clusters being associated with the border region, and some clusters being associated with the foreground element. Each cluster may comprise a pixel or a group of pixels. For example, a cluster may comprise an N×N cluster of pixels, such as a 4×4 or 8×8 cluster of pixels. In one aspect, the frame of the video stream may be partitioned into a grid of cells, with each cell of the grid comprising a cluster. Each of the cells of the grid may thereby be identified as corresponding to one of the background element, the border region, and/or the foreground element. As an example, clustering may be observed in the frame 600 of the video stream shown in FIG. 6A, particularly with respect to the stepped edges of the respective borders between the border region 606 and the foreground element 602 and the border region 606 and the background element 604. In another aspect, the frame of the video stream may be partitioned into variably sized and/or shaped clusters. Such variably sized and shaped clusters may be observed in the frame 600B of FIG. 6B. However, for purposes of illustration, the example methods and techniques of the present disclosure are described with reference to N×N clusters of pixels.

It is noted that the operator depicted in FIGS. 6A, 6B, and 7-9 is obscured for reasons of privacy and such visual effect is not relevant to the present disclosure.

As indicated above, the method 400 may compare video content of a background cluster of the plurality of background clusters (i.e., the clusters comprising the background element) with video content of one or more border clusters of the plurality of border clusters (i.e., the clusters comprising the border region). For example, video content of the background cluster may be successively compared against video content of one or more of the foregrounds clusters until video content is found that sufficiently matches the video content of the background cluster. As another example video content of the background cluster may be compared against video content of each of the border clusters. It is noted that the video content of a cluster may comprise a color, which, in turn, may be defined by one or more color appearance parameters. Color appearance parameters may include, but are not limited to, hue, lightness, brightness, chroma, colorfulness, saturation, or any combination thereof. Accordingly, the comparison of the video content of the background cluster with the video content of one or more border clusters may comprise a comparison of one or more of said color appearance parameters. A color appearance parameter may be represented as one or more numerical values. For example, in a color defined according to an RGB color model, the color may be represented by a triplet of numerical values, with the values of the triplet corresponding to a respective numerical value (e.g., 0 to 255) of the red, green, and blue aspects of the color. As another example, a brightness of a color may be represented by a percentage value, such as a value between 0% and 100%.

In the event that a background cluster and/or border cluster includes more than one color (or other characteristic of video content), this scenario may be addressed in one of several ways. In one aspect, a predominant color may be determined and deemed to represent the color of that cluster. For example, if a 4×4 pixel cluster includes three white pixels and one tan pixel, the cluster may be considered to be white for comparison purposes. In another aspect, an average color of the colors of the cluster may be determined and used as the representative color for that cluster. Recalling that a color may be defined by one or more color appearance parameters, which may each be represented by a numerical value, a mathematical average may be used to determine the average color representing a cluster. As an example, a 2×2 pixel cluster may contains pixels each with the same color hue but with two pixels having a lightness value of 75% and two pixels having a lightness value of 25%. A mathematical average of the four lightness values may be performed to arrive at a 50% lightness value for the cluster, which may be used as the representative color appearance parameter for the cluster. Such a technique may be similarly performed with other color appearance parameters defining the color(s) of the pixels of a cluster.

As one example technique to determine a border cluster with video content that most closely matches video content of the background cluster, particularly when the respective video content comprises color appearance parameters represented by numerical values, the border cluster may be determined according to the numerical value of the color appearance parameter of the border cluster that is numerically closest to the numerical value of the color appearance parameter of the background cluster.

The steps of comparing video content of a background cluster with video content of one or more border clusters, determining a border cluster with the most closely matching video content, and replacing the background cluster with the determined border cluster may be repeated for additional background clusters. For example, these steps may be repeated for each background cluster comprising the background element until each is replaced with a border cluster with a most closely matching video content.

In an aspect, a blur effect may optionally be applied to the background element with the replaced clusters. The blur effect may minimize or eliminate any visual artifacts caused by the clustering as well as further obscuring the background region.

Figure 5:
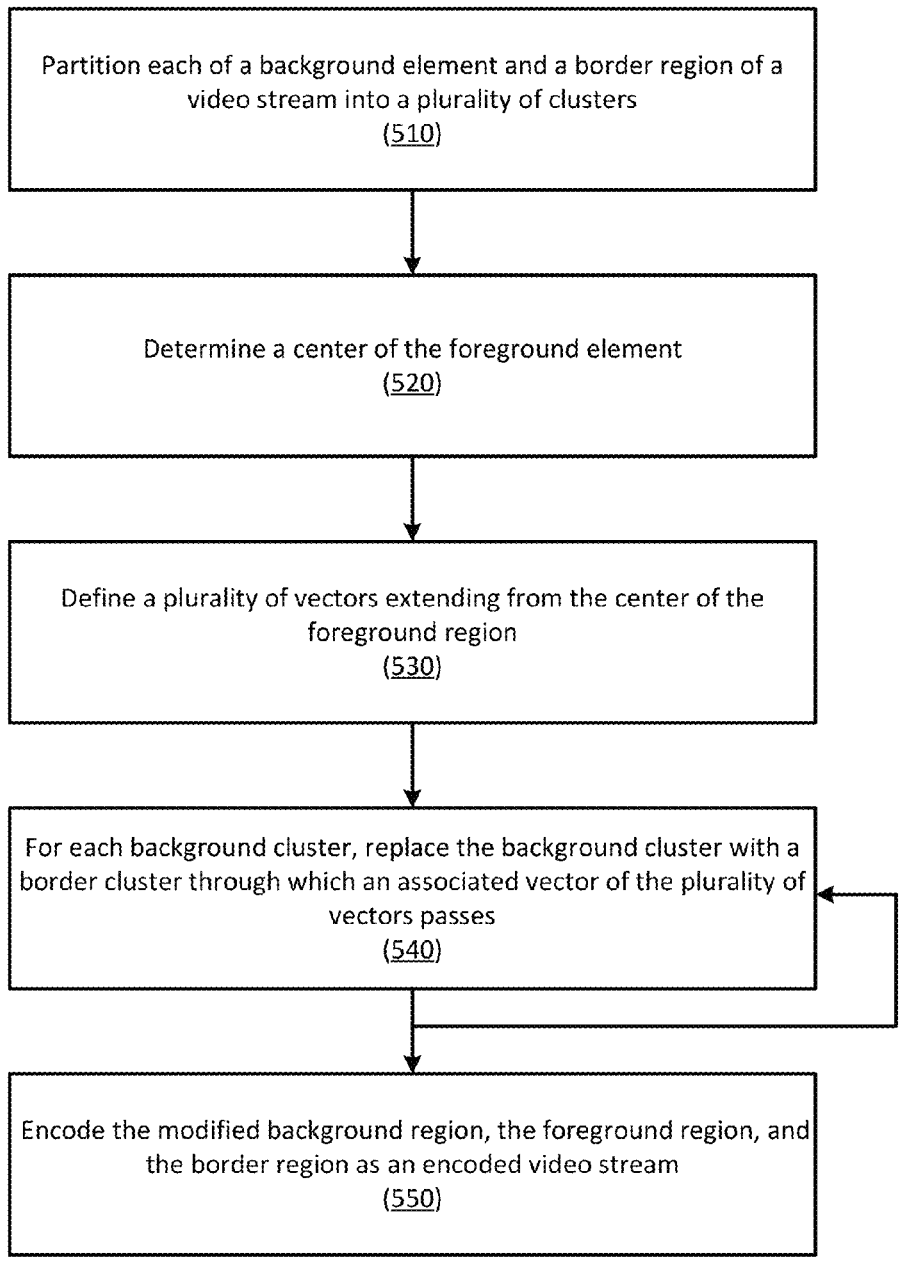
FIG. 5 illustrates a method according to an embodiment of the present disclosure.

FIG. 5 illustrates another method 500 of modifying one or more frames of a video stream according to an embodiment of the present disclosure. The method 500 may be utilized, for example, during such a modification performed in the method 300 discussed in relation to FIG. 3. It is assumed that the background element, the foreground element, and/or the border region have already been identified in one or more frames of the video stream.

The method 500 may initially partition the background element into a plurality of background clusters and the border region into a plurality of border clusters (box 510). The method 500 may determine a center of the foreground element (box 520). The method 500 may further define a plurality of vectors extending outward from the center of the foreground element (box 530). For each of one or more background clusters, the method 500 may replace the background cluster with a border cluster through which an associated vector of the plurality of vectors passes (box 540). Thereafter, the method 500 may encode the modified background element in an encoded video stream, which may be transmitted to a second terminal (box 550).

Partitioning the background element into a plurality of background clusters and the border region into a plurality of border clusters may be performed in a similar manner as described above with respect to the method 400 of FIG. 4. For example, each cluster may comprise one or more pixels. For instance, each cluster may comprise an N×N cluster of pixels, such as 2×2 or 4×4 cluster of pixels.

The determination of the center of the foreground element may comprise determining a center (e.g., a center of "mass") of an operator depicted in the foreground element. This may be accomplished through various object recognition techniques known in the art. For example, a body recognition algorithm may be used to identify the body of the operator. Accordingly, a point in the chest region of the operator may be determined as the center of the foreground element. As another example, a facial recognition algorithm may be used to identify the face of the operator and/or facial feature(s) of the operator. A central feature of the face, such as the nose, may define the center of the foreground element.

As indicated, each vector of the defined plurality of vectors may extend outward from the center of the foreground element. For example, for each background cluster, a vector may be defined that extends from the center of the foreground element to that background cluster. That vector may thereby be associated with that background cluster.

As the border region may be situated between at least a portion of the background element and at least a portion of the foreground element, it is noted that each vector of the plurality of vectors may pass through one or more border clusters of the border region. Accordingly, as already mentioned above, the method 500 may replace a background cluster with a border cluster through which an associated vector of the plurality of vectors passes from the center of the foreground element to that background cluster. In the event that the associated vector passes through only a single border cluster, that border cluster may replace the background cluster. However, if the associated vector passes through multiple border clusters, the border cluster with which to replace the background cluster may be determined according to one or more of several techniques.

In one exemplary technique, the border cluster with which to replace the background cluster may be determined according to the video content (e.g., the color or color appearance parameter) of the border clusters through which the associated vector passes. For example, the video content of the background cluster may be compared with the video content of the border clusters through which the vector passes. Based on the comparison, the border cluster to use in replacing the background cluster may be selected according to which border cluster has video content that most closely matches that of the background cluster. The comparison of the video content of the background cluster and border clusters and subsequent determination of one of the border clusters may be performed in a similar manner as that described above in relation to the method 400 of FIG. 4, except that the set of border clusters from which to compare and select is limited to the border clusters that the particular vector passes through.

In another exemplary technique for determining the border cluster with which to replace the background cluster, the border cluster may be determined according to the relative positions of the border clusters along the vector. For example, in one aspect, the border cluster (of the border clusters through which the vector passes) that is farthest away from the center of the foreground element (or in other words, the one closest to the background cluster) may be selected to replace the background cluster.

The steps to replace a background cluster with a border cluster through which an associated vector passes may be repeated for additional and/or all background clusters comprising the background element. In this manner, a visual effect may be achieved in which the outermost border clusters extend outward into the background element, thereby obscuring details in the background region that the operator 102 may wish to keep private, as well as minimizing the visual delineation between the border region and the background element.

A blur effect may additionally be applied to the background element, which may act to further obscure any private or sensitive details in the background region, as well as remove visual artifacts caused by the clustering of the background element.

Figure 8:
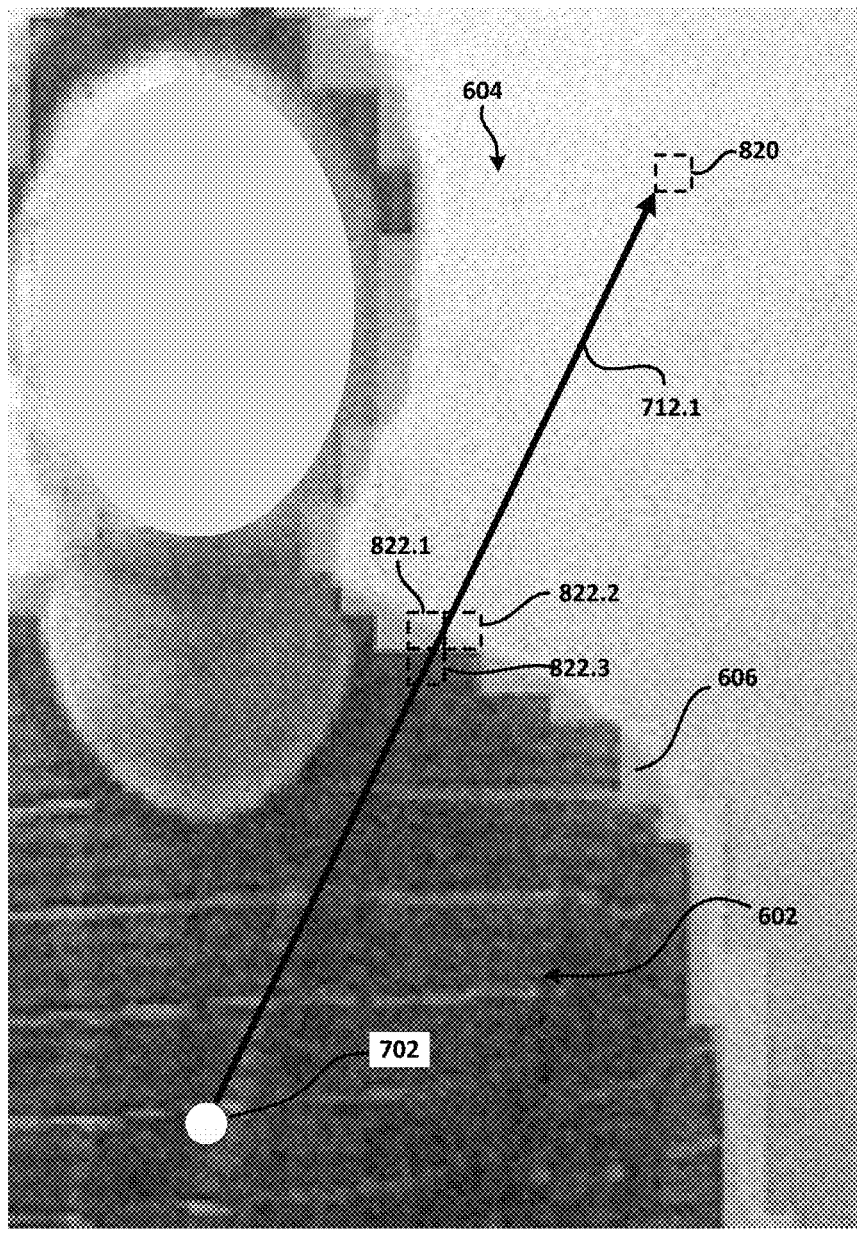
FIG. 8 illustrates a close-up view of a portion of a frame of a video conferencing video stream according to an embodiment of the present disclosure.
Figure 9:
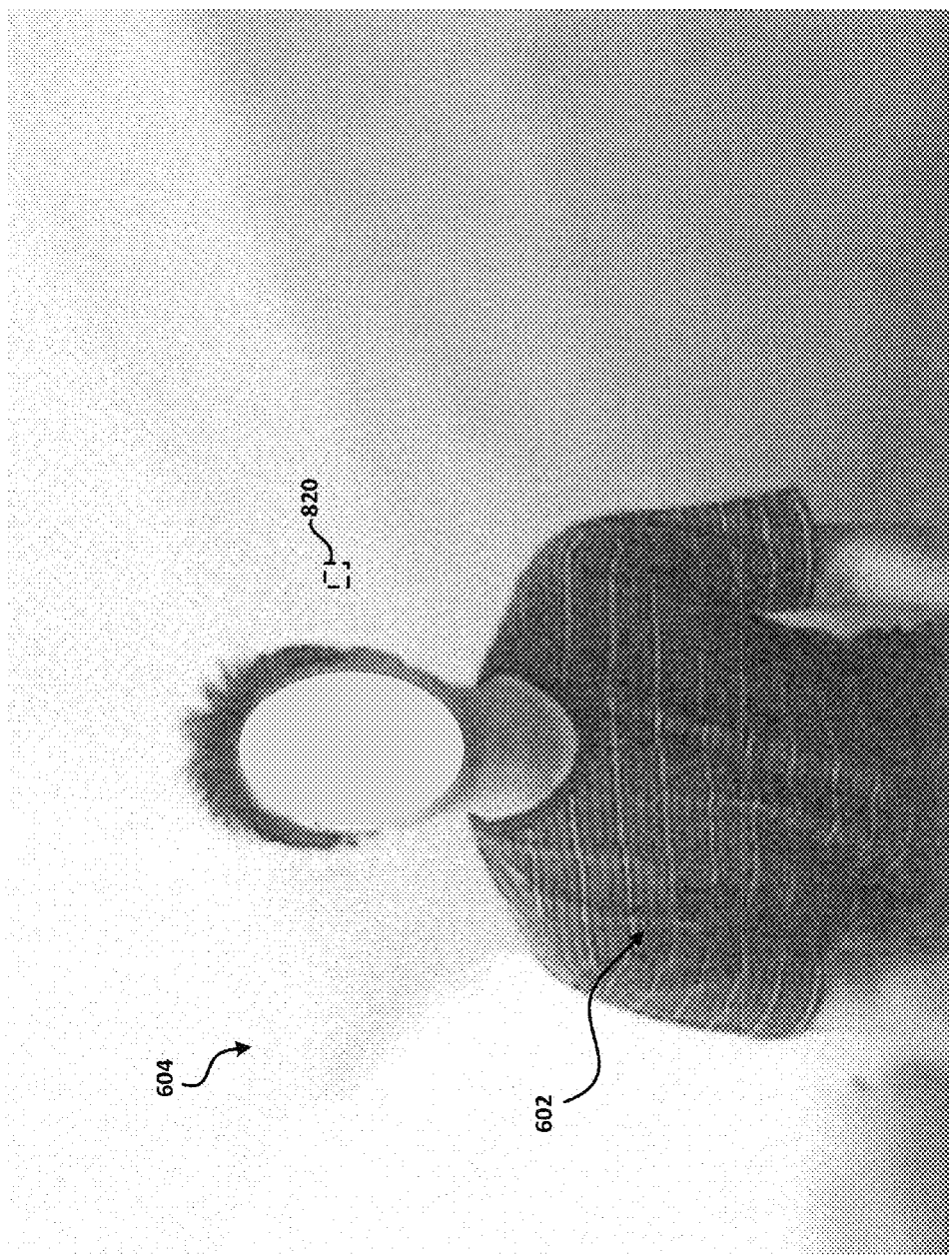
FIG. 9 illustrates a modified frame of a video conferencing video stream according to an embodiment of the present disclosure.

FIGS. 7-9 illustrate an example application of the method 500 described in relation to FIG. 5. FIG. 7 depicts a frame 700 of a video stream based on the frame 600 shown in FIG. 6A. Like the frame 600 of FIG. 6A, the frame 700 includes the identified background element 604, the foreground element 602, and the border region 606. A center 710 of the foreground element 602 may be determined that generally corresponds with a central point of the operator's 610 chest region. As described above, the center 710 may be determined according to a body recognition algorithm.

A plurality of vectors 712 (not all labeled) may be defined that extend outward from the center 710 of the foreground element 602 to the background element 604. For example, each vector 712 may extend from the center 710 of the foreground element 602 to a particular background cluster (not shown in FIG. 7) of the background element 604. It will be appreciated that since the background element 604 may comprise a great number of background clusters, the number of vectors 712 depicted in FIG. 7 is merely illustrative and limited for sake of visual clarity. It is contemplated that many more vectors 712 may be defined than are shown in FIG. 7.

FIG. 8 depicts a close-up view 800 of a portion of the frame 700 of FIG. 7. The close-up view 800 depicts an example vector 712.1 (the other vectors 712 show in FIG. 7 have been omitted for simplicity) that extends from the center 702 of the foreground element 602 to an example background cluster 820 in the background element 604. The vector 712.1 passes through a portion of the border region 606. In particular, the vector 712.1 passes through the border clusters 822.1, 822.2, and 822.3. According to the method 500 of FIG. 5, the background cluster 820 may be replaced with one of the border clusters 822.1, 822.2, 822.3 through which the vector 712.1 passes.

According to one technique described above, one of the border clusters 822.1, 822.2, 822.3 may be selected to use in the replacement by comparing the respective video content (e.g., the color or color appearance parameter(s)) of the border clusters 822.1, 822.2, 822.3 with the video content of the background cluster 820. Here, the video content of the border cluster 822.2 may most closely match the video content of the background cluster 820. Therefore, the background cluster 820 may be replaced with the border cluster 822.2.

According to another technique described above, one of the border clusters 822.1, 822.2, 822.3 may be selected to replace the background cluster 820 by comparing the relative positions of the border clusters 822.1, 822.2, 822.3 along the vector 712.1 with respect to the position of the center 702 of the foreground element 602 and/or the position of the background cluster 820. In particular, the border cluster 822.1, 822.2, 822.3 that is closest to the background cluster 820 (or, conversely, that is farthest away from the center 702 of the foreground element 602) may be selected to use in the replacement of the background cluster 820. In this example, the border cluster 822.2 is closest to the background cluster 820 and therefore may be used to replace the background cluster 820.

One or more of the aforementioned techniques may be applied to each of the background clusters to replace that cluster with one of the border clusters, thereby modifying the background element 604 to obscure personal or security-sensitive details in the background element 604 and minimize the visual delineation between the border region 606 and the background element 604.

FIG. 9 depicts a resultant frame 900 of the video stream modified from the frames 600, 700 shown in FIGS. 6 and 7. In the frame 900, the background cluster 820 has been replaced with the border cluster 822.2 from FIG. 8. The other background clusters comprising the background element 604 have also been similarly replaced with a respective border cluster. A blur effect has also been provided to the background element 604 to eliminate visual artifacts from the clustering and to further obscure details in the background element 604. The frame 900 may be encoded and included in a video stream provided to another terminal participating in the video conferencing session.

In an alternative embodiment, after the background element is identified but before the various background concealment methods and techniques described above are applied, the identified background element may be replaced with a pre-determined background element. For example, the system 200 of FIG. 2 may include a background element repository (not shown) of pre-determined background elements. The background element repository may include pre-determined background elements having a variety of color profiles and/or patterns. After the identified background element is replaced with the pre-determined background element, the various background concealment methods and techniques described herein may proceed using the pre-determined background element. The pre-determined background element may include a background that is artistically composed or may be a realistic background template, such as a pre-determined office background. The pre-determined background may be selected so that the resultant modified background element is relatively easy to encode, such as to minimize extensive details in the modified background element that are computationally intensive to encode. Further, a pre-determined background element may be pre-processed so that the border region may be extended into the pre-determined background element in a natural way.

In an alternative embodiment, the modified background element may be generated to impart an artistic quality to the modified background element. In one aspect, the modified background element may be generated based on the border region. However, rather than using and modifying the instant background element, the modified background element instead may be generated independent of the instant background element. For example, this modified background element may be generated from a "blank" background element having no image content. As another example, the modified background element may be generated from a background element having a particular color profile and/or pattern that produces an aesthetically attractive effect in the resultant modified background element.

A machine learning technique may be applied in generating the modified background elements over multiple frames of the video data. For example, statistical data may be generated from processing multiple frames of the video data. This statistical data may be used as training set data for a machine learning algorithm.

In yet another alternative embodiment, the sequence of multiple frames in the video data may be leveraged to generate the modified background element. One or more frames of the video data that are sequentially prior to a present frame may be analyzed, such as by the image analyzer 220 of FIG. 2, to select a pre-determined background element (e.g., from the aforementioned background element repository) that is most appropriate given the background element and/or border region of the previous frames. For example, the selection of the pre-determined background element may be based on the color profile of the border region and/or background elements of one or more frames previous to the present frame. For instance, the selection of the pre-determined background element may be based on an approximate or best match of the color profile of the pre-determined background element with the color profile of the border region and/or background element of the present frame.

The selected pre-determined background element may replace the background element of the present frame to generate the modified background element. Alternatively, the selected pre-determined background element may replace the background element of the present frame and further apply one or more of the various techniques described herein to modify the present background element based on the present border region. In yet another alternative implementation, the selected pre-determined background element may be modified based on the border region of a previous frame. Such a technique may take advantage of visual commonalities between sequential frames of the video data.

It has been observed that the various background concealment methods and techniques described herein provide one or more advantages. One advantage is that a fast, yet potentially imperfect, segmentation method may be used to identify the background, border, and/or foreground regions. This, in turn, allows the background concealment techniques to be used in real-time and to be used in applications in which power consumption and/or processing power are limited, such as with a mobile device. Another advantage provided is that the boundary (e.g., the border region) between the background and foreground elements may be preserved in the resulting encoded video stream. Yet another advantage is that the background region is effectively hidden or obscured so that private or security-sensitive details in the background region are not communicated to other operators in the video conferencing session. Furthermore, the visual delineation that may otherwise occur between the background element and the border region may be minimized.

Figure 10:
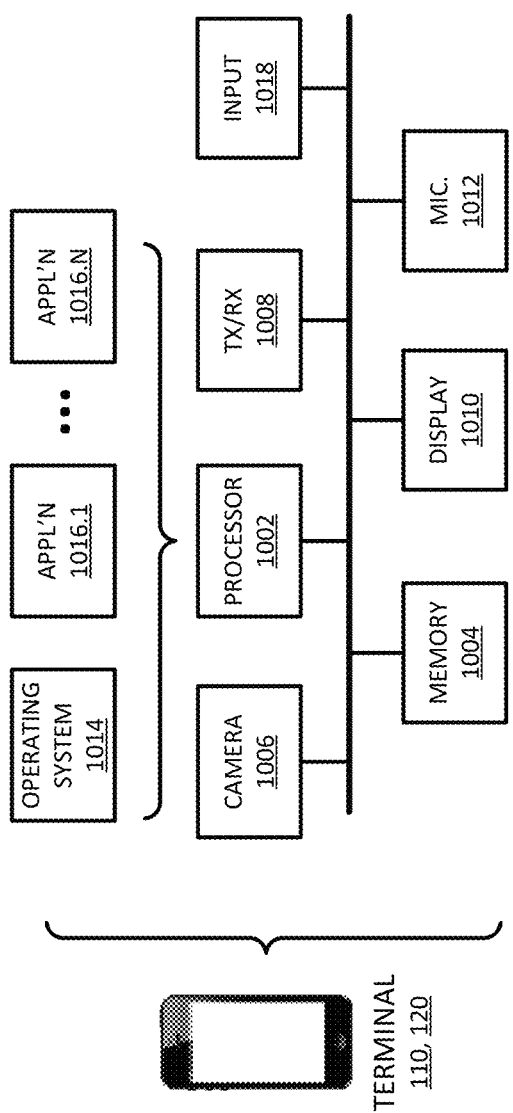
FIG. 10 illustrates a terminal according to an embodiment of the present disclosure.

FIG. 10 illustrates a simplified block diagram of the terminals 110, 120 (FIG. 1) according to an embodiment of the present disclosure. Each terminal 110, 120 may be embodied as a computing device, such as mobile device (e.g., smart phone, laptop, or tablet computer) or a stationary computing device (e.g., a personal computer, a gaming console, or a set-top digital media player). A personal computer or other type of computing device may include a main hardware unit as well as attached peripherals, such as an external camera (e.g., a "webcam") and/or an external microphone. It will be appreciated that the several terminals 110, 120 do not necessarily have to comprise the same type of computing device. For example, the first terminal 110 may comprise a smart phone and the second terminal 120 may comprise a personal computer.

Each of the terminals 110, 120 may be configured with a processor 1002 and memory 1004. The memory 1004 may store an operating system 1014 and one or more applications 1016.1-1016.N that may perform various operations relating to video chat background concealment described herein. For example, the one or more applications 1016.1-1016.N may include a video chat application that receives a video stream and encodes and/or otherwise processes the video stream, such as performing background concealment, before sending the video stream to an analogous video application running on another terminal. Conversely, the video chat application may receive the video stream from another terminal, decode the video stream, and cause the video stream to be displayed to the operator. The operating system 1014 and applications 1016.1-1016.N may be executed by the processor 202.

Each of the terminals 110, 120 may further include a camera 1006 and a microphone 1012. The camera 1006 may be pointed at the operator 102, 104 or other subject and capture a video stream of the operator 102, 104 or other subject. The video stream from the camera 1006 may accordingly be provided to the video chat application for encoding or other processing. The camera 1006 may be incorporated into the terminal 110, 120, such as is typically the case with a smart phone or tablet computer, or may be separate from but connected to the main body of the terminal 110, 120. For example, the camera 1006 may be embodied as an external camera (e.g., a "webcam") that is connected to a personal computer. In some aspects, the terminals 110, 120 may each include multiple cameras 1006. For example, the terminal 110, 120 may include a pair of similarly-faced cameras 1006 that together capture a stereoscopic video stream. A stereoscopic video stream may be useful in determining the depths of objects in the video stream which, in turn, may aid in distinguishing a foreground object (e.g., an operator) from the background. The microphone 1012 may capture audio, such as the voice of an operator participating in a video chat. The captured audio may be provided to the video chat application. The video chat application may synchronize and combine the audio with the video stream from the camera 1006. As used herein, unless indicated otherwise explicitly or by context, reference to a video stream or the like may include a video stream with an audio component or a video stream without an audio component.

Each of the terminals 110, 120 may further include a transceiver 1008 to effectuate communication with the network 150 and other terminals. The transceiver 1008 may include a wireless and/or a wired communication interface to effectuate said communication. For example, the transceiver 1008 may include a Wi-Fi interface to communicate with a Wi-Fi access point. As another example, the transceiver 1008 may include a cellular communication interface to enable communication over a cellular network. As yet another example, the transceiver 1008 may include an network interface controller (NIC) with an Ethernet adapter for connecting to a wired Ethernet network.

Each of the terminals 110, 120 may yet further be configured with a display 1010. The display 1010 may be used, for example, to enable interaction with the video chat application, as well as to view the video stream provided by the video chat application. The display 1010 may be incorporated with the terminal 110, 120, as is commonly the case with a smart phone or tablet computer, and may include an LCD (liquid crystal display). In other aspects, the display 1010 may be a separate connected component to the main hardware unit. For example, the display 1010 may include an LCD or LED (light emitting diode) computer monitor connected to a personal computer. An input mechanism 1018 may further be provided with the terminals 110, 120 to facilitate interaction by the operator 102, 104. The input mechanism 1018 may include a touch-sensitive screen, a keyboard, or a mouse or other pointing device, as some examples.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method comprising:
generating, by a first terminal, a video stream;
identifying a border region in a frame of the video stream, the border region enclosing a boundary between a foreground element of the frame and a background element of the frame;
modifying the background element of the frame based, at least in part, on content from the border region; and
transmitting the video stream with the modified frame to a second terminal.

2. The method of claim 1, wherein the foreground element includes content representing an operator of the first terminal.

3. The method of claim 1, further comprising identifying a region of the foreground element and a region of the background element by depth estimation, wherein the identifying the border region includes identifying a region between the regions of the foreground and background elements.

4. The method of claim 1, further comprising identifying a region of the foreground element by object recognition, wherein the identifying the border region includes identifying a region about a periphery of the object of the foreground element.

5. The method of claim 1, further comprising identifying a region of the foreground element by edge detection, wherein the identifying the border region includes identifying a region along an edge of the foreground element.

6. The method of claim 1, further comprising identifying a region of the foreground element and a region of the background element by motion detection, wherein the identifying the border region includes identifying a region between the regions of the foreground and background elements.

7. The method of claim 1, wherein modifying the background element comprises:
replacing content of a portion of the background element with content of the border region according to a determination that video content of the portion of the border region most closely matches, relative to the video content of the other portions of the border region, video content of the portion of the background element.

8. The method of claim 1, wherein modifying the background element comprises:
defining a vector from a center of the foreground element to a portion of the background element, the vector passing through the border region; and
replacing the portion of the background element with a portion of the border region through which the vector passes.

9. The method of claim 1, further comprising applying a blur effect to the modified background element.

10. The method of claim 1, wherein the modifying the background element is further based on content from a pre-determined background element different from the background element of the frame.

11. The method of claim 1, wherein the modifying the background element is further based on content from a second background element, the second background element generated based on content from a border region of a second frame prior in the video stream to the frame.

12. The method of claim 11, wherein the modifying the background element comprises replacing the background element with the second background element.

13. A method comprising:
generating, by a first terminal, a video stream;
identifying a border region in the video stream, the border region a boundary between a foreground element of the video stream and a background element of the video stream;
partitioning the background element into a plurality of background clusters;
partitioning the border region into a plurality of border clusters;
comparing video content of a background cluster of the plurality of background clusters with video content of one or more border clusters of the plurality of border clusters;
based at least in part on the comparison, determining a border cluster of the plurality of border clusters with video content that most closely matches, relative to the respective video content of the other border clusters of the plurality of border clusters, the video content of the background cluster;
modifying the background element by replacing the background cluster with the determined border cluster; and
transmitting the modified video stream to a second terminal.

14. The method of claim 13, wherein the video content of the border clusters of the plurality of border clusters and the video content of the background cluster are defined, at least in part, by a color appearance parameter comprising at least one of: hue, lightness, brightness, chroma, colorfulness, and saturation.

15. The method of claim 13, wherein the border clusters of the plurality of border clusters and the background clusters of the plurality of background clusters each comprise a plurality of pixels, each pixel having a color.

16. The method of claim 15, wherein the color of one or more of the border clusters of the plurality of border clusters or the color of the background cluster is represented by a color predominant among the colors of the pixels of the cluster.

17. The method of claim 15, wherein the color of one or more of the border clusters of the plurality of border clusters or the color of the background cluster is represented by a color average of the colors of the pixels of the cluster.

18. The method of claim 13, further comprising applying a blur effect to the modified background element.

19. A method comprising:
generating, by a first terminal, a video stream;
identifying a border region in the video stream, the border region a boundary between a foreground element of the video stream and a background element of the video stream;
partitioning the background element into a plurality of background clusters;
partitioning the border region into a plurality of border clusters;
determining a center of the foreground element;
defining a vector extending from the center of the foreground element to a background cluster of the plurality of background clusters, the vector passing through one or more border clusters of the plurality of border clusters;
selecting a border cluster from the one or more border clusters through which the vector passes;
modifying the background element by replacing the background cluster with the selected border cluster; and
transmitting the modified video stream to a second terminal.

20. The method of claim 19, wherein the determining the center of the foreground element comprises:
    determining a portion of the foreground element corresponding to a body of an operator of the first terminal; and
    determining a chest region of the body of the operator, the center of the foreground element being located in the chest region.

21. The method of claim 19, wherein the determining the center of the foreground element comprises:
    determining a portion of the foreground element corresponding to a face of an operator of the first terminal; and
    determining a facial feature on the face of the operator, the center of the foreground element being located at the facial feature.

22. The method of claim 19, wherein the selecting the border cluster from the one or more border clusters through which the vector passes is based, at least in part, on respective colors of the one or more border clusters and a color of the background cluster.

23. The method of claim 19, wherein the selecting the border cluster from the one or more border clusters through which the vector passes is based, at least in part, on a relative position of the selected border cluster with the background cluster.

24. The method of claim 23, wherein the selected border cluster is the border cluster of the one or more border cluster though which the vector passes that is most near to the background cluster.

25. The method of claim 19, further comprising applying a blur effect to the modified background element.

26. An apparatus comprising:
    a processor; and
    a computer-readable medium having instructions that, when executed by the processor, effectuate operations comprising:
    identifying a border region in a video stream, the border region a boundary between a foreground element of the video stream and a background element of the video stream;
    modifying the background element of the video stream based, at least in part, on video content from the border region; and
    transmitting the modified video stream.

27. The apparatus of claim 26, wherein the instructions further cause the processor to, as part of the modifying:
    partition the background element into a plurality of background clusters;
    partition the border region into a plurality of border clusters;
    compare video content of a background cluster of the plurality of background clusters with video content of one or more border clusters of the plurality of border clusters;
    based at least in part on the comparison, determining a border cluster of the plurality of border clusters with video content that most closely matches, relative to the respective video content of the other border clusters of the plurality of border clusters, the video content of the background cluster; and
    modifying the background element by replacing the background cluster with the determined border cluster.

28. The apparatus of claim 26, wherein the instructions further cause the processor to, as part of the modifying:
    partition the background element into a plurality of background clusters;
    partition the border region into a plurality of border clusters;
    determine a center of the foreground element;
    define a vector extending from the center of the foreground element to a background cluster of the plurality of background clusters, the vector passing through one or more border clusters of the plurality of border clusters;
    select a border cluster from the one or more border clusters through which the vector passes; and
    modify the background element by replacing the background cluster with the selected border cluster.

29. A computer-readable medium having instructions that, when executed by a processor, effectuate operations comprising:
    generating, by a first terminal, a video stream;
    identifying a border region in the video stream, the border region a boundary between a foreground element of the video stream and a background element of the video stream;
    modifying the background element of the video stream based, at least in part, on video content from the border region; and
    transmitting the modified video stream to a second terminal.

30. The medium of claim 29, wherein the program instruction further cause the processor to, as part of the modifying:
    partition the background element into a plurality of background clusters;
    partition the border region into a plurality of border clusters;
    compare video content of a background cluster of the plurality of background clusters with video content of one or more border clusters of the plurality of border clusters;
    based at least in part on the comparison, determining a border cluster of the plurality of border clusters with video content that most closely matches, relative to the respective video content of the other border clusters of the plurality of border clusters, the video content of the background cluster; and
    modifying the background element by replacing the background cluster with the determined border cluster.

31. The medium of claim 29, wherein the program instruction further cause the processor to, as part of the modifying:
    partition the background element into a plurality of background clusters;
    partition the border region into a plurality of border clusters;
    determine a center of the foreground element;
    define a vector extending from the center of the foreground element to a background cluster of the plurality of background clusters, the vector passing through one or more border clusters of the plurality of border clusters;
    select a border cluster from the one or more border clusters through which the vector passes; and
    modify the background element by replacing the background cluster with the selected border cluster.

32. The method of claim 1, wherein modifying the background element comprises replacing content of the background element using content derived from content from the border region.

33. The method of claim 1, wherein modifying the background element comprises:

modifying a portion of the background element based on the content of a select portion of the border region, wherein the selection of the select portion of the border region is based on a distance from the select portion of the border region to the portion of the background element.

34. The method of claim 33, wherein the select portion of the border region is most near the portion of the background element relative to the other portions of the border region.

* * * * *